No. 756,146. PATENTED MAR. 29, 1904.
P. P. SCHRAMEK.
CLOTH MEASURING AND EXAMINING MACHINE.
APPLICATION FILED NOV. 30, 1903.
NO MODEL. 2 SHEETS—SHEET 1.
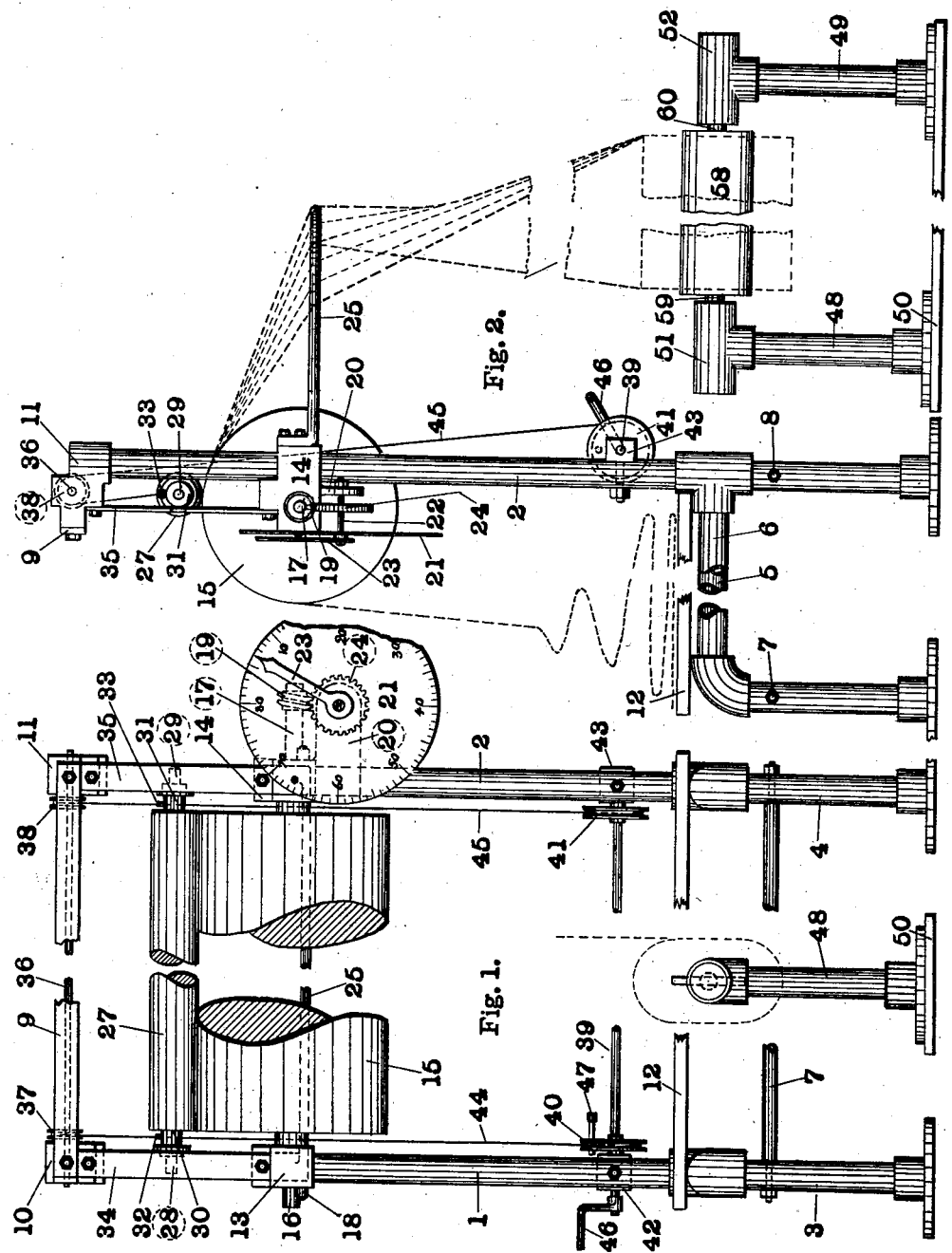
Witnesses:
Inventor: P. P. Schramek,
By
Attorneys.

No. 756,146. PATENTED MAR. 29, 1904.
P. P. SCHRAMEK.
CLOTH MEASURING AND EXAMINING MACHINE.
APPLICATION FILED NOV. 30, 1903.
NO MODEL. 2 SHEETS—SHEET 2.

Witnesses: Inventor: P. P. Schramek,
By Carr & Carr,
Attorneys.

No. 756,146. Patented March 29, 1904.

UNITED STATES PATENT OFFICE.

PETER P. SCHRAMEK, OF ST. LOUIS, MISSOURI, ASSIGNOR OF ONE-HALF TO LOUIS F. KORACH, OF ST. LOUIS, MISSOURI.

CLOTH MEASURING AND EXAMINING MACHINE.

SPECIFICATION forming part of Letters Patent No. 756,146, dated March 29, 1904.

Application filed November 30, 1903. Serial No. 183,173. (No model.)

*To all whom it may concern:*

Be it known that I, PETER PAUL SCHRAMEK, a citizen of the United States, and a resident of the city of St. Louis and State of Missouri, have invented a new and useful Improvement in Cloth Measuring and Examining Machines, of which the following is a specification.

My invention relates to machines for measuring and examining cloth; and its principal objects are to provide for simultaneously measuring and examining cloth, to spread double-width cloth as it is unrolled from the bolt so that it may pass through the measuring mechanism and before the eye of the examiner in a single thickness, and other objects hereinafter more fully appearing.

My invention consists in the parts and in the arrangements and combinations of parts hereinafter more fully appearing.

Figure 3:
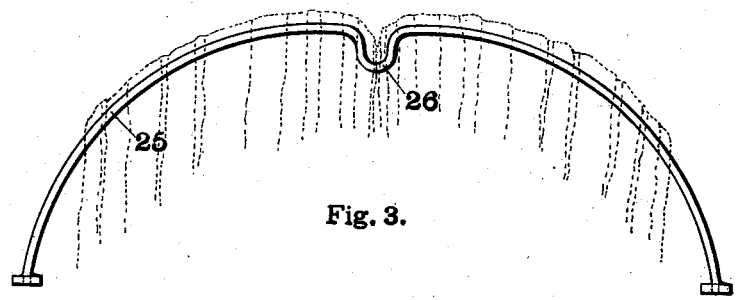
Figure 4:
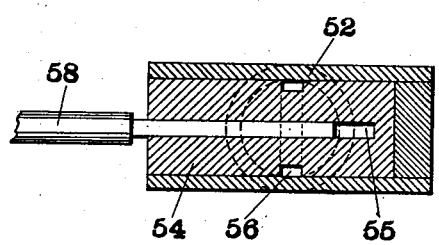
Figure 7:
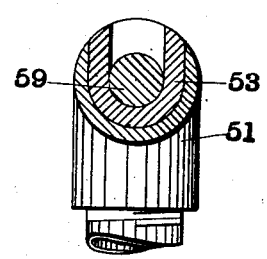
Figures 5, 6:
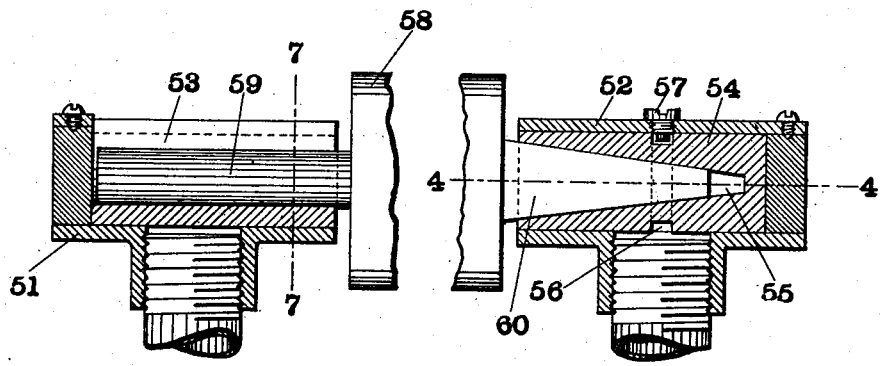

In the accompanying drawings, forming part of this specification, and wherein like symbols refer to like parts wherever they occur, Figure 1 is a front view of the machine, the middle portion being broken away to reduce the width of the figure. Fig. 2 is a side view similarly broken. Fig. 3 is a plan view of the spreader. Figs. 4 to 7 are sectional detail views of the bearings of the bolt-support.

Before wholesale manufacturers use the goods that is furnished them in bolts they require that it be measured to determine whether the bolts measure up to their mark and that it be examined to discover faults that would impair the value of apparel. As this work is now conducted two distinct operations are necessary in the case of single-width goods. It is first run through a measuring-machine, and, second, it is run over an inspecting-frame. For double-width goods three distinct operations are frequently necessary. First, the bolt of folded goods must be rewound into a longer bolt having the goods wound on it in single thickness; second, it is run through the measuring-machine, and, third, it is run over an inspecting-frame. By means of the hereinafter-described machine it is possible to measure and examine either single or double width goods in the time necessary to perform one of the operations just enumerated.

The frame of the machine comprises uprights 1 2 and legs 3 4, which are connected in pairs by forwardly-extending horizontal sections 5 6. Rods 7 8 tie the standards and legs together at the bottom. At the top the uprights are tied together by a bar 9, bolted to brackets 10 11, mounted on their tops. The legs and forwardly-extending sections support a top 12, and thus constitute a table to receive the goods as it comes from the measuring mechanism and after it has been examined. At a suitable height above the table brackets 13 14 are secured to the standard 1 2. Between the two standards is a cylindrical measuring-drum 15, having journals 16 17 upon its opposite ends. The journals project through the brackets and bear upon rollers 18, mounted upon the outer sides of the latter. A worm 19 is secured upon the end of the journal 17. A plate 20 extends laterally from the bracket. A dial 21 is also secured to the bracket and extends laterally therefrom. The said plate and dial are provided with alined bearings in which a spindle 22 is journaled. Upon the front end of the spindle a pointer 23 is frictionally held, and intermediate the bearings the spindle 22 carries a worm-wheel 24 to mesh with the worm 19. Thus the rotation of the spindle is proportional to the number of revolutions of the drum. The dial is graduated in yards.

A curved spreader 25 is secured to the brackets 13 14 and extends rearwardly. It is substantially semielliptical in shape and has a reëntrant section 26 at its center, as clearly illustrated in Fig. 3. The function of the spreader is to open out double-width goods as it is unreeled from the bolt. The goods pass over the spreader, as shown in Figs. 2 and 3. The folded edge passes into the reëntrant section 26, the curving sides of which spread this section of cloth as it leaves the spreader. This prevents the folded edge turning over and passing to the measuring-drum in a plait incapable of being smoothed out by the roller 27.

Resting upon the measuring-drum 15 is a heavy roller 27. Its journals 28 29 pass through collars 30 31, having eyes 32 33. A guideway for the roller is formed by the standards 1 2 and plates 34 35, extending from the brackets 10 11 to the brackets 13 14, respectively. An upper axle 36, having pulleys 37 38 fixed thereon near its ends, is journaled in the brackets 10 11. A lower axle 39, having pulleys 40 41 fixed thereon near its ends, is journaled in brackets 42 43, secured to the standards near the top of the table. Cords 44 45 are secured to pulleys 40 41, respectively, pass over the pulleys 37 38, respectively, and are connected to the collars 30 31, respectively. At one end the lower axle is provided with a crank 46, and a stop-pin 47 is slidingly mounted in the adjacent pulley 40. The said stop-pin is long enough to engage the adjacent standard 1 when pushed outwardly, and thus prevent rotation of the pulleys. By this means the roller 27 may be held up while a new piece of goods is being inserted.

The bolt-support consists of two uprights 48 49, secured to a base-plate 50. At their upper ends the uprights are provided with bearings 51 52. One bearing, 51, is slotted and is provided with a similarly-slotted bushing 53. The other bearing, 52, is provided with a rotatable cylindrical journal-block 54, having a tapering axial recess 55 rectangular in transverse section and a circumferential groove 56. A screw 57 passes through the bearing-case and enters the groove, thus preventing the withdrawal of the journal-block. A flat plate 58 is provided at one end with a journal 59 and at the other end with a tapering stud 60. The said plate is adapted to be inserted in the bolt next the usual board. Then the tapering stud 60 is inserted in the tapering recess 55 in the journal-block 54, and the journal 59 is dropped into the slotted bearing 51. The bolt is thus rotatably mounted in the bolt-support.

The operation of the machine will now be described. In working with double-width goods the goods-support is set with its axis substantially at right angles to the axis of the measuring-drum and longitudinal center line of the table. The bolt is mounted on the support so that the free edges of the goods project rearwardly while the fold is toward the machine. The roller is then raised and the goods is passed over the spreader and measuring-drum. Then the roller is lowered and allowed to rest on the measuring-drum. The folded goods in passing over the spreader is opened out and passes over the measuring-drum in a single layer. It is likely, however, to be more or less wrinkled, and it is one function of the roller to smooth the wrinkles out. The operator standing in front of the machine pulls the goods over the measuring-drum and downwardly to the table, inspecting it as it passes in front of him. This method of running the goods through the measuring mechanism tends to cause it to slip on the drum. It is a second function of the roller to bear upon the entire width of the goods with such force that the slip is prevented. The height of the measuring-drum above the table is such that the depending length of goods is no greater than can be readily inspected. In working with single-width goods the goods-support is set with its axis parallel to the axis of the measuring-drum. The goods is passed immediately over the drum and the operation is the same as before.

While the bolt-support has been shown as physically separate from the frame of the machine, (and this construction is preferable,) it is obvious that it may be rotatably mounted upon a bracket projecting from said frame.

Obviously the machine admits of considerable modification within the scope of my invention, and therefore I do not wish to be limited to the specific construction hereinbefore described.

What I claim as my invention, and desire to secure by Letters Patent, is—

1. A cloth measuring and examining machine comprising a frame, measuring mechanism mounted therein, and a curved spreader having a reëntrant middle portion and arranged to spread the goods to be operated on as it enters the measuring mechanism.

2. A cloth measuring and examining machine comprising a frame, measuring mechanism mounted therein, a bolt-support angularly adjustable with respect to said measuring mechanism, and a curved spreader between said bolt-support and said measuring mechanism.

3. A cloth measuring and examining machine comprising a frame, measuring mechanism therein, a bolt-support angularly adjustable with respect to said measuring mechanism, and a spreader arranged between said bolt-support and said measuring mechanism and having a reëntrant middle portion.

4. A cloth measuring and examining machine comprising a frame, a table extending forwardly therefrom, measuring mechanism mounted in said frame above said table and a rearwardly-extending spreader having a reëntrant middle portion and arranged to spread the goods to be operated on.

5. A cloth measuring and examining machine comprising a frame, a table extending forwardly therefrom, measuring mechanism mounted in said frame above said table, a bolt-support angularly adjustable with respect to said measuring mechanism, and a curved spreader arranged to spread the goods to be operated on as it is unreeled from said bolt-support.

6. A bolt-support for a cloth measuring and examining machine comprising uprights, bearings on said uprights, one of said bearings being slotted, and the other of said bearings having a journal-block revolubly mounted therein and provided with a recess, and a plate provided with a stud at one end adapted to engage said recess and a journal on the other end adapted to engage said slotted bearing.

In testimony whereof I have signed my name to this specification in the presence of two subscribing witnesses.

P. P. SCHRAMEK.

Witnesses:
   FRED. F. REISNER,
   JULIA B. MEGOWN.